United States Patent
Hotta et al.

(10) Patent No.: US 8,427,924 B2
(45) Date of Patent: Apr. 23, 2013

(54) OPTICAL PICKUP APPARATUS

(75) Inventors: Tohru Hotta, Okaya (JP); Ryoichi Kawasaki, Isesaki (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 49 days.

(21) Appl. No.: 12/973,757

(22) Filed: Dec. 20, 2010

(65) Prior Publication Data
US 2011/0149709 A1 Jun. 23, 2011

(30) Foreign Application Priority Data

Dec. 21, 2009 (JP) ................. 2009-289135
Dec. 14, 2010 (JP) ................. 2010-278322

(51) Int. Cl.
*G11B 7/00* (2006.01)

(52) U.S. Cl.
USPC .................. 369/112.23; 369/44.23

(58) Field of Classification Search ............. 369/112.23, 369/44.23
See application file for complete search history.

(56) References Cited

U.S. PATENT DOCUMENTS

2003/0231574 A1* 12/2003 Okuda et al. ............. 369/124.12
2005/0265207 A1* 12/2005 Yamamoto et al. ........... 369/125
2008/0049584 A1* 2/2008 Tan et al. ................. 369/112.16

FOREIGN PATENT DOCUMENTS

JP 2006-172608 6/2006

* cited by examiner

*Primary Examiner* — Latanya Bibbins
(74) *Attorney, Agent, or Firm* — SoCal IP Law Group LLP; John E. Gunther; Steven C. Sereboff

(57) ABSTRACT

An optical-pickup apparatus includes: a three-wavelength-laser diode including first-, second-, and third-laser elements to emit first-, second-, and third laser beams having first, second, and third wavelengths, respectively, the three laser elements housed in the same case; an objective lens to focus the three laser beams onto first- to third-optical-disc-signal-recording layers, respectively; a first photodetector to be irradiated with first-return light reflected from the first-optical-disc-signal-recording layer, a second photodetector to be irradiated with second- and third-return lights respectively reflected from the second- and third-optical-disc-signal-recording layers; a polarizing-beam splitter to reflect the three laser beams toward the lens, and allow the three return lights having passed through the lens to pass therethrough; a semi-transparent mirror on which the three return lights having passed through the polarizing-beam splitter are incident, and which guide the first-return light toward the first photodetector and the second- and third-return lights toward the second photodetector.

5 Claims, 5 Drawing Sheets

OPTICAL PICKUP APPARATUS

CROSS-REFERENCE TO RELATED APPLICATION

This application claims the benefit of priority to Japanese Patent Application Nos. 2009-289135 and 2010-278322, filed Dec. 21, 2009, and Dec. 14, 2010, respectively, of which full contents are incorporated herein by reference.

BACKGROUND OF THE INVENTION

1. Field of the Invention

The present invention relates to an optical pickup apparatus that performs operations for reading signals recorded in optical discs and operations for recording signals into optical discs using a laser beam.

2. Description of the Related Art

Optical disc apparatuses are widely used, each of which is capable of performing a signal reading operation and a signal recording operation with a laser beam emitted from an optical pickup apparatus being applied to a signal recording layer of an optical disc.

Although optical disc apparatuses using optical discs called CD and DVD are generally used, optical disc apparatuses are recently commercialized that use optical discs with record densities improved, i.e., optical discs of the Blu-ray standard.

Infrared light having a wavelength of 785 nm is used as a laser beam for performing the operation of reading signals recorded in a CD-standard optical disc, and red light having a wavelength of 660 nm is used as a laser beam for performing the operation of reading signals recorded in a DVD-standard optical disc.

A transparent protective layer provided between a signal recording layer and an optical disc surface in a CD-standard optical disc has a thickness of 1.2 mm, and a numerical aperture is set at 0.47 in an objective lens used for performing the operation of reading signals from the signal recoding layer. A transparent protective layer provided between a signal recording layer and an optical disc surface in a DVD-standard optical disc has a thickness of 0.6 mm, and a numerical aperture is set at 0.6 in an objective lens used for performing the operation of reading signals from the signal recoding layer.

In contrast to the CD-standard and DVD-standard optical discs, a laser beam having a shorter wave length, for example, blue-violet light having a wavelength of 405 nm is used as a laser beam for performing the operation of reading signals recorded in a Blu-ray-standard optical disc.

A protective layer provided on a top surface of a signal recording layer of the Blu-ray-standard optical disc has a thickness of 0.1 mm, and a numerical aperture is set at 0.85 in an objective lens used for performing the operation of reading signals from the signal recording layer.

It is necessary to reduce a diameter of a laser spot which is formed by a laser beam being focused in order to read signals recorded on the signal recording layer provided in a Blu-ray standard optical disc or to record signals onto the signal recording layer. An objective lens used for acquiring a desired laser spot shape is characterized in not only an increased numerical aperture but also a shortened focal length, and thus a reduced radius of curvature of the objective lens is reduced.

An optical disc apparatus has been commercialized which is capable of performing the operations of reading signals recorded in and recording signals into all the optical discs of the CD standard, the DVD standard, and the Blu-ray standard described above, and an optical pickup apparatus built into such an optical disc apparatus includes a laser diode that emits laser beams having wavelengths corresponding to the above-described standards and an objective lens that focuses the laser beams emitted from the laser diode onto the signal recording layers provided in the optical discs.

The optical pickup apparatus capable of performing the operation of reading signals recorded in the optical discs of all the different standards described above includes two objective lenses, i.e., an objective lens that performs the laser-beam focusing operation for the CD-standard and DVD-standard optical discs and an objective lens that performs the laser-beam focusing operation for the Blu-ray-standard optical disc.

Such an optical pickup apparatus including two objective lenses has not only a problem that a configuration of an optical system becomes complicated but also a problem that a size of the optical pickup apparatus is increased. As a method for solving such problems, such a technique is developed that one objective lens performs the laser-beam focusing operations for the optical discs of all the standards.

A patent document (Japanese Laid-Open Patent Publication No. 2006-172608) discloses an optical pickup apparatus including a semiconductor laser that has light-emitting elements for emitting a first laser beam, a second laser beam, and a third laser beam of different wavelengths housed in the same housing, one objective lens that focuses the first, second, and third laser beams emitted from the semiconductor laser onto three types of optical discs of different standards, and one photodetector irradiated with the return light reflected by an optical disc.

The optical pickup apparatus disclosed in the patent document is configured so as to perform the operation of reading signals recorded in three types of optical discs of different standards using one semiconductor laser, one objective lens, and one photodetector, however, there is such a problem that the apparatus becomes expensive as well as that the configuration thereof becomes complicated since an optical axis correcting element is necessary for correcting misalignment of optical axes.

SUMMARY OF THE INVENTION

An optical pickup apparatus according to an aspect of the present invention, includes: a three-wavelength laser diode including a first laser element configured to emit a first laser beam having a first wavelength for reading a signal recorded on a signal recording layer of a first optical disc, a second laser element configured to emit a second laser beam having a second wavelength, longer than the first wavelength, for reading a signal recorded on a signal recording layer of a second optical disc of a standard different from a standard of the first optical disc, and a third laser element configured to emit a third laser beam having a third wavelength, longer than the second wavelength, for reading a signal recorded on a signal recording layer of a third optical disc of a standard different from the standards of the first optical disc and the second optical disc, the first, second, and third laser elements housed in the same case; an objective lens on which the first to third laser beams are incident through the same optical path, the objective lens configured to focus the first to third laser beams onto the signal recording layers of the first to third optical discs, respectively; a first photodetector configured to be irradiated with first return light reflected from the signal recording layer of the first optical disc, a second photodetector configured to be irradiated with second return light and third return light respectively reflected from the signal recording layers of the second and third optical discs; a polarizing beam splitter configured to reflect the first to third laser beams in a direction of the objective lens so that the first to third laser beams are incident on the objective lens through the same optical path, and to allow the first return light to the third return light having passed through the objective lens to pass therethrough; a semitransparent mirror on which the first return light to the third return light having passed through the polarizing beam splitter are incident, the semitransparent mirror configured to guide the first return light in a direction of the first photodetector, and to guide the second return light and the third return light in a direction of the second photodetector.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
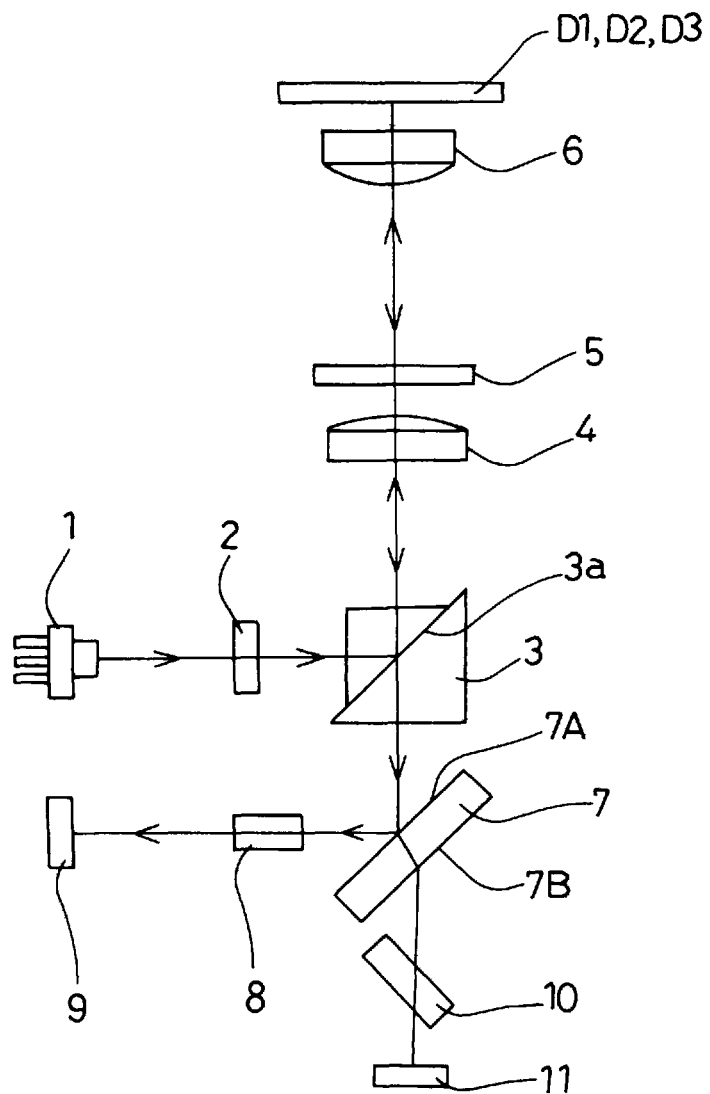
FIG. 1 is a schematic diagram illustrating an optical pickup apparatus according to an embodiment of the present invention.

At least the following details will become apparent from descriptions of this specification and of the accompanying drawings.

An optical pickup apparatus according to an embodiment of the present invention includes: an objective lens, on which first, second, and third laser beams emitted from a three-wavelength laser diode are incident through the same optical path, and which focuses the laser beams onto signal recording layers provided in the optical discs; a first photodetector irradiated with first return light reflected from a signal recording layer of a first optical disc; and a second photodetector irradiated with second return light reflected from a signal recording layer provided in a second optical disc and third return light reflected from a signal recording layer provided in a third optical disc, and the optical pickup apparatus further includes: a polarizing beam splitter that reflects all the laser beams emitted from the three-wavelength laser diode in a direction of the objective lens direction and that allows the first return light, the second return light, and the third return light to pass therethrough via the objective lens; and a semitransparent mirror on which the first return light, the second return light, and the third return light having passed through the polarizing beam splitter are incident, and the semitransparent mirror guides the first return light in a direction of the first photodetector and the second return light and the third return light in a direction of the second photodetector.

In the optical pickup apparatus according to an embodiment of the present invention, the first return light is reflected by a front surface provided on the semitransparent mirror and is guided in the direction of the first photodetector, and the second return light and the third return light is passed through the front surface and a rear surface and is guided to the second photodetector.

In the optical pickup apparatus according to an embodiment of the present invention, an optical axis of a third laser beam emitted from a third laser element coincides with the optical axis of the objective lens.

In the optical pickup apparatus according to an embodiment of the present invention, the second photodetector is provided with a second-return-light receiving unit that receives the second return light and a third-return-light receiving unit that receives the third return light, and a distance between the second-return-light receiving unit and the third-return-light receiving unit is set equal to a distance between a second laser element and the third laser element which are housed in the three-wavelength laser diode.

The optical pickup apparatus according to an embodiment of the present invention uses one objective lens to focus three laser beams emitted from the three-wavelength laser diode onto the signal recording layers of optical discs of different standards, and uses the semitransparent mirror to split the return light reflected from the optical discs to be guided in the directions of the two photodetectors, and thus, an optical axis correcting element for aligning the optical axes can be omitted. Therefore, the optical pickup apparatus according to an embodiment of the present invention can be manufactured at lower cost as well as has a simpler configuration.

The optical pickup apparatus according to an embodiment of the present invention is configured such that the operation of focusing three laser beams having different wavelengths emitted from the three-wavelength laser diode onto signal recording layers provided in optical discs of three different standards is performed by the focusing operation of one objective lens, and that each of the three return light beams to be applied to the two photodetectors is split by the semitransparent mirror.

In FIG. 1, reference numeral 1 denotes a three-wavelength laser diode that house in the same case a first laser element configured to emit a first laser beam of blue-violet light having a wavelength of 405 nm, a second laser element configured to emit a second laser beam of red light having a wavelength of 660 nm, and a third laser element configured to emit a third laser beam of infrared light having a wavelength of 785 nm, for example, and reference numeral 2 denotes a diffraction grating on which the first laser beam, the second laser beam, and the third laser beam emitted from the three-wavelength laser diode 1 are incident, and the diffraction grating 2 includes a diffraction grating unit, which splits each of the first laser beam and the third laser beam into a main beam of zero-order light and two sub-beams of plus first-order light and minus first-order light, and a half-wave plate, which converts an incident laser beam into S-linearly-polarized light.

Reference numeral 3 denotes a polarizing beam splitter, on which the first laser beam, the second laser beam, and the third laser beam having passed through the diffraction grating 2 are incident, and which has a control film 3a formed therein which reflects all the laser beams of the S-polarized light incident thereon through the diffraction grating 2 while allowing the P-polarized light to pass therethrough.

Reference numeral 4 denotes a collimating lens, on which the first laser beam, the second laser beam, and the third laser beam reflected by the control film 3a of the polarizing beam splitter 3 are incident, and the collimating lens 4 converts the incident laser beam into parallel light. Reference numeral 5 denotes a quarter-wave plate compatible with three wavelengths which is provided in a position where the laser beam having been converted into parallel light with the collimating lens 4 is incident, and the quarter-wave plate 5 converts the incident laser from linearly-polarized light into circularly-polarized light, or in reverse, from circularly-polarized light into linearly-polarized light.

Reference numeral 6 denotes an objective lens, on which the first laser beam, the second laser beam, and the third laser beam having passed through the quarter-wave plate 5 are incident, and the objective lens 6 is configured to focus the first laser beam onto a signal recording layer provided in a first optical disc D1 when the first optical disc D1 is used, to focus the second laser beam onto a signal recording layer provided in a second optical disc D2 when the second optical disc D2 is used, and to focus the third laser beam onto a signal recording layer provided in a third optical disc D3 when the third optical disc D3 is used.

On the above-described objective lens 6, an annular diffraction zone, etc., are formed that act on the laser beams having the wavelengths, and a numerical aperture setting element, etc., are provided for setting the numerical apertures corresponding to the optical discs.

In such configuration, the first laser beam, the second laser beam, and the third laser beam emitted from the three-wavelength laser diode 1 are incident on the objective lens 6 via the diffraction grating 2, the polarizing beam splitter 3, the collimating lens 4, and the quarter-wave plate 5, and thereafter, are applied as focused spots onto the signal recording layers provided on the first optical disc D1, the second optical disc D2, and the third optical disc D3 through the focusing operation of the objective lens 6, and the first laser beam, the second laser beam, and the third laser beam applied to the signal recording layers are reflected as the first return light, the second return light, and the third return light.

The first return light reflected from the first optical disc D1, the second return light reflected from the second optical disc D2, and the third return light reflected from the third optical disc D3 are incident on the polarizing beam splitter 3 through the objective lens 6, the quarter-wave plate 5, and the collimating lens 4, and the first return light, the second return light, and the third return light have been converted into the P-linearly-polarized light through the phase changing operation of the quarter-wave plate 5. Therefore, the first return light, the second return light, and the third return light passes through the control film 3a without being reflected by the control film 3a.

Reference numeral 7 denotes a semitransparent mirror provided in a position where the first return light, the second return light, and the third return light having passed through the control film 3a of the polarizing beam splitter 3 are incident, and a front surface 7A thereof has a control film formed thereon so that only the first return light is reflected thereby while the second return light and the third return light passes therethrough. A rear surface 7B of the semitransparent mirror 7 is configured to allow the second return light and the third return light to pass therethrough.

Figure 4:
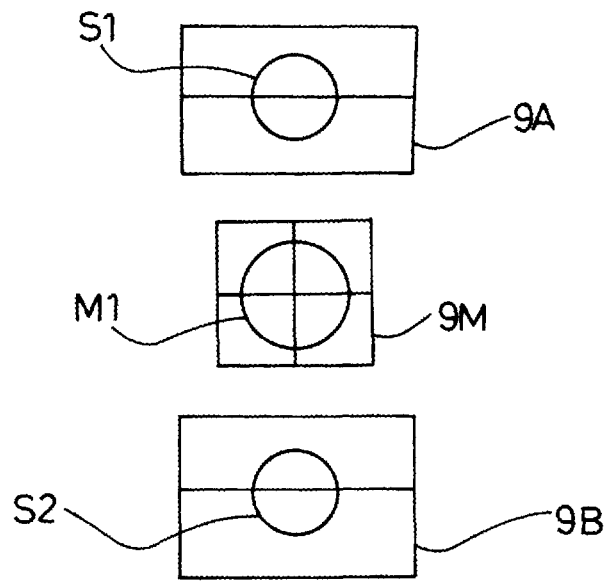
FIG. 4 is a plain view of a light-receiving unit of a photodetector included in an optical pickup apparatus according to an embodiment of the present invention.

Reference numeral 8 denotes an anamorphic lens provided in a position where the first return light reflected by the front surface 7A of the semitransparent mirror 7 is incident, and the anamorphic lens 8 is configured to cause astigmatism suitable for an operation of generating a focus error signal. Reference numeral 9 denotes a first photodetector provided in a position where the first return light, focused by the anamorphic lens 8, is applied, and as depicted in FIG. 4, the first photodetector 9 includes a main beam light-receiving unit 9M, which is divided into four pieces and is irradiated with a main beam M1, and sub-beam light-receiving units 9A and 9B, each of which is divided into two pieces in a track direction of the optical disc and which are irradiated with sub-beams S1 and S2.

Reference numeral 10 denotes an astigmatism plate (hereinafter, referred to as AS plate) provided in a position where the second return light and the third return light emitted from the rear surface 7B of the semitransparent mirror 7 is incident, and the AS plate 10 is configured to enlarge the astigmatism caused by the semitransparent mirror 7 to become astigmatism suitable for the operation of generating the focus error signal. The AS plate 10 is arranged in such a manner as to be inclined in a direction opposite to a direction of the semitransparent mirror 7 relative to the optical axis, and has a function of correcting coma aberration of the second return light and the third return light caused by the semitransparent mirror 7. It is preferable that the AS plate 10 has a refractive index equivalent to that of the semitransparent mirror 7, e.g., using the same material as that of the semitransparent mirror 7, has a thickness set equivalent to that thereof, and is inclined in a direction opposite to the direction of the semitransparent mirror 7 with the same inclined angle as that of the semitransparent mirror 7. The AS plate 10 is configured as such, so as to effectively correct the coma aberration of the second return light and the third return light. A difference in laser wavelength between the second return light and the third return light causes a difference in refractive index between the second return light and the third return light when the light passes through the semitransparent mirror 7. Thus, spacing between the second return light and the third return light is slightly different between spacing therebetween before the light passes through the semitransparent mirror 7 and spacing therebetween after the light has passed therethrough. The AS plate 10 functions such that the spacing between the second return light and the third return light after the light has passed through the semitransparent mirror 7 is reset to a state before the light pass therethrough. As described above, if the AS plate 10 has a refractive index equivalent to that of the semitransparent mirror 7, has a thickness set equivalent to that thereof, and is inclined in a direction opposite to the direction of the semitransparent mirror 7 with the same inclined angle as that of the semitransparent mirror 7, the spacing between the second return light and the third return light, which has been changed by the semitransparent mirror 7, is reset to the state before being changed.

Figure 5:
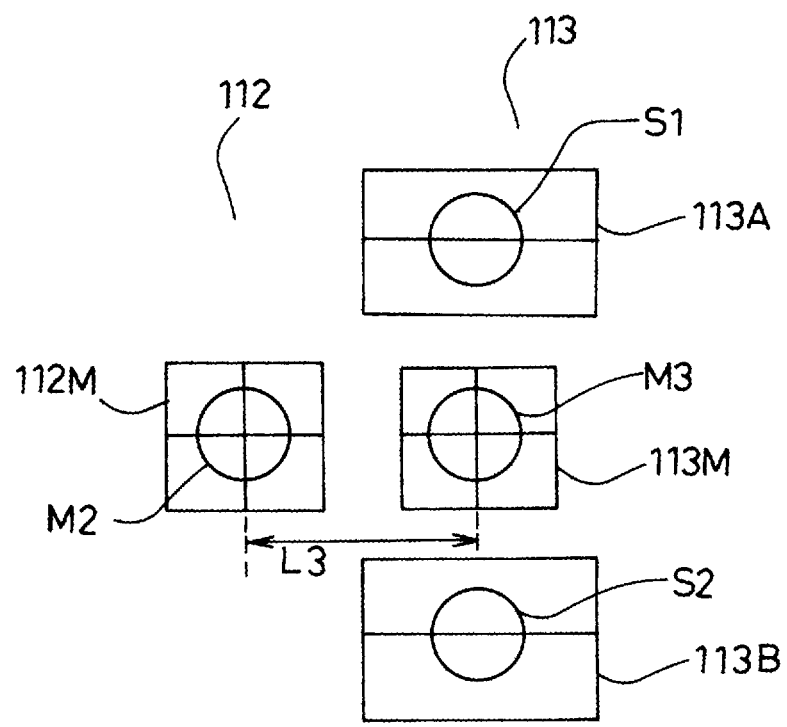
FIG. 5 is a plain view of a light-receiving unit of the photodetector included in an optical pickup apparatus according to an embodiment of the present invention.

Reference numeral 11 denotes a second photodetector provided in a position where the second return light and the third return light having passed through the AS plate 10 are applied, and as depicted in FIG. 5, the second photodetector 11 includes a second-return-light receiving unit 112 that receives the second return light, and a third-return-light receiving unit 113 that receives the third return light.

The second photodetector 11 includes the second-return-light receiving unit 112 and the third-return-light receiving unit 113 as described above, and the second-return-light receiving unit 112 includes a main beam light-receiving unit 112M, which is divided into four pieces and is irradiated with a main beam M2, the third-return-light receiving unit 113 includes a main beam light-receiving unit 113M, which is divided into four pieces and is irradiated with a main beam M3, and sub-beam light-receiving units 113A and 113B, each of which is divided into two pieces in the track direction of the optical disc and which are irradiated with the sub-beams S1 and S2 respectively.

The optical pickup apparatus according to an embodiment of the present invention is configured as described above, and the operations of the optical pickup apparatus having such configuration will then be described.

When the operation for reading signals recorded in the first optical disc D1 is performed, a drive signal is supplied to the first laser element included in the three-wavelength laser diode 1, and the first laser element emits the first laser beam having a first wavelength. The first laser beam emitted from the first laser element is converted into S-linearly-polarized light and divided into a main beam and two sub-beams by the diffraction grating 2, and then emitted therefrom.

The first laser beam emitted from the diffraction grating 2 is reflected by the control film 3a of the polarizing beam splitter 3 and is incident on the collimating lens 4. The first laser beam incident on the collimating lens 4 is incident on the quarter-wave plate 5 after having been converted into parallel light, and is converted by the quarter-wave plate 5 from the linearly-polarized light into the circularly-polarized light. The first laser beam emitted from the quarter-wave plate 5 is incident on the objective lens 6, and a desired laser spot is formed on the signal recording layer provided in the first optical disc D1 through the focusing operation of the objective lens 6.

The first laser beam applied to the first optical disc D1 as such is reflected, as the first return light, from the signal recording layer. This first return light is incident on the polarizing beam splitter 3 via the objective lens 6, the quarter-wave plate 5, and the collimating lens 4. The first return light made incident on the polarizing beam splitter 3 as such passes through the control film 3a of the polarizing beam splitter 3, and then is incident on the semitransparent mirror 7.

The first return light incident on the semitransparent mirror 7 is reflected by the front surface 7A, and is incident on the anamorphic lens 8. The first return light made incident on the anamorphic lens 8 as such is applied to the first photodetector 9, and the main beam M1 and the sub-beams S1, S2 making up the first return light are applied onto the main beam light-receiving unit 9M and the sub-beam light-receiving units 9A, 9B, as depicted in FIG. 4. Therefore, a focus error signal for performing the focus control operation by the astigmatism method can be obtained from the signal acquired from the main beam light-receiving unit 9M, and a tracking error signal for performing the tracking control operation by the differential push-pull method can be obtained from the signals acquired from the main beam light-receiving unit 9M and the sub-beam light-receiving units 9A, 9B.

Since the focus control operation and the tracking control operation can be performed by utilizing the focus error signal and the tracking error signal obtained as such, the operation of reading signals recorded in the first optical disc D1 can be performed.

The operation of reading signals recorded in the first optical disc D1 is performed as described above, and the operation of reading signals recorded in the second optical disc D2 will then be described.

When the operation of reading signals recorded in the second optical disc D2 is performed, a drive signal is supplied to the second laser element included in the three-wavelength laser diode 1, and the second laser element emits the second laser beam having a second wavelength. The second laser beam emitted from the second laser element is converted into S-linearly-polarized light by the diffraction grating 2 and the main beam M2 is emitted.

The second laser beam emitted from the diffraction grating 2 is reflected by the control film 3a of the polarizing beam splitter 3, and is incident on the collimating lens 4. The second laser beam incident on the collimating lens 4 is incident on the quarter-wave plate 5 after having been converted into parallel light, and is converted by the quarter-wave plate 5 from the linearly-polarized light into the circularly-polarized light. The second laser beam emitted from the quarter-wave plate 5 is incident on the objective lens 6, and a desired laser spot is formed on the signal recording layer provided in the second optical disc D2 through the focusing operation of the objective lens 6.

The second laser beam applied to the second optical disc D2 as such is reflected as the second return light from the signal recording layer. This second return light is incident on the polarizing beam splitter 3 via the objective lens 6, the quarter-wave plate 5, and the collimating lens 4. The second return light made incident on the polarizing beam splitter 3 as such passes through the control film 3a of the polarizing beam splitter 3, and then is incident on the semitransparent mirror 7 as described above.

The second return light incident on the semitransparent mirror 7 passes through the front surface 7A and the rear surface 7B, and is incident on the AS plate 10. The second return light incident on the AS plate 10 is applied to the second photodetector 11, and the main beam M2 is applied onto the main beam light-receiving unit 112M making up the second-return-light receiving unit 112, as depicted in FIG. 5. Therefore, a focus error signal for performing the focus control operation by the astigmatism method can be obtained from the signal acquired from the main beam light-receiving unit 112M, and a tracking error signal for performing the tracking control operation by the phase difference method can also be obtained.

Since the focus control operation and the tracking control operation can be performed by utilizing the focus error signal and the tracking error signal that are obtained as such, the operation of reading signals recorded in the second optical disc D2 can be performed.

The operations of reading signals recorded in the first optical disc D1 and the second optical disc D2 are performed as described above, and the operation of reading signals recorded in the third optical disc D3 will then be described.

When the operation of reading signals recorded in the third optical disc D3 is performed, a drive signal is supplied to the third laser element included in the three-wavelength laser diode 1, and the third laser element emits the third laser beam having a third wavelength. The third laser beam emitted from the third laser element is converted into S-linearly-polarized light and divided into the main beam M3 and the two sub-beams S1, S2 by the diffraction grating 2, and then emitted therefrom.

The third laser beam emitted from the diffraction grating 2 is reflected by the control film 3a of the polarizing beam splitter 3 and is incident on the collimating lens 4. The third laser beam incident on the collimating lens 4 is incident on the quarter-wave plate 5 after having been converted into parallel light, and is converted by the quarter-wave plate 5 from the linearly-polarized light into the circularly-polarized light. The third laser beam emitted from the quarter-wave plate 5 is incident on the objective lens 6, and a desired laser spot is formed on the signal recording layer provided in the third optical disc D3 through the focusing operation of the objective lens 6.

The third laser beam applied to the third optical disc D3 as such is reflected as the third return light from the signal recording layer. This third return light is incident on the polarizing beam splitter 3 via the objective lens 6, the quarterwave plate 5, and the collimating lens 4. The third return light incident on the polarizing beam splitter 3 as such passes through the control film 3a of the polarizing beam splitter 3, and then is incident on the semitransparent mirror 7 as described above.

The third return light incident on the semitransparent mirror 7 passes through the front surface 7A and the rear surface 7B, and is incident on the AS plate 10. The third return light incident on the AS plate 10 is applied to the second photodetector 11, and the main beam M3 and the sub-beams S1, S2 making up the third return light are applied onto the main beam light-receiving unit 113M and the sub-beam light-receiving units 113A, 113B, as depicted in FIG. 5. Therefore, a focus error signal for performing the focus control operation by the astigmatism method can be obtained from the signal acquired from the main beam light-receiving unit 113M, and a tracking error signal for performing the tracking control operation by the differential push-pull method can be obtained from the signals acquired from the main beam light-receiving unit 113M and the sub-beam light-receiving units 113A, 113B.

Since the focus control operation and the tracking control operation can be performed by utilizing the focus error signal and the tracking error signal that are obtained as such, the operation of reading signals recorded in the third optical disc D3 can be performed.

The operations of reading signals in the optical pickup apparatus according to an embodiment of the present invention are performed as described above, and a relationship between the configuration of the three-wavelength laser diode 1 and the optical system of the optical pickup apparatus will then be described.

The three-wavelength laser diode is configured so as to house in one case the first laser element configured to emit the first laser beam having a wavelength of 405 nm, the second laser element configured to emit the second laser beam having a wavelength of 660 nm, and the third laser element configured to emit the third laser beam having a wavelength of 785 nm. The second laser element and the third laser element are manufactured as monolithic laser diodes. The first laser element is manufactured as a hybrid laser diode.

The three-wavelength laser diode having such configuration is characterized in that the second laser element and the third laser element can be arranged close to each other and a distance therebetween can accurately be set while a distance between the first laser element and the second laser element or the third laser element cannot accurately be set and shortened.

Figure 3:
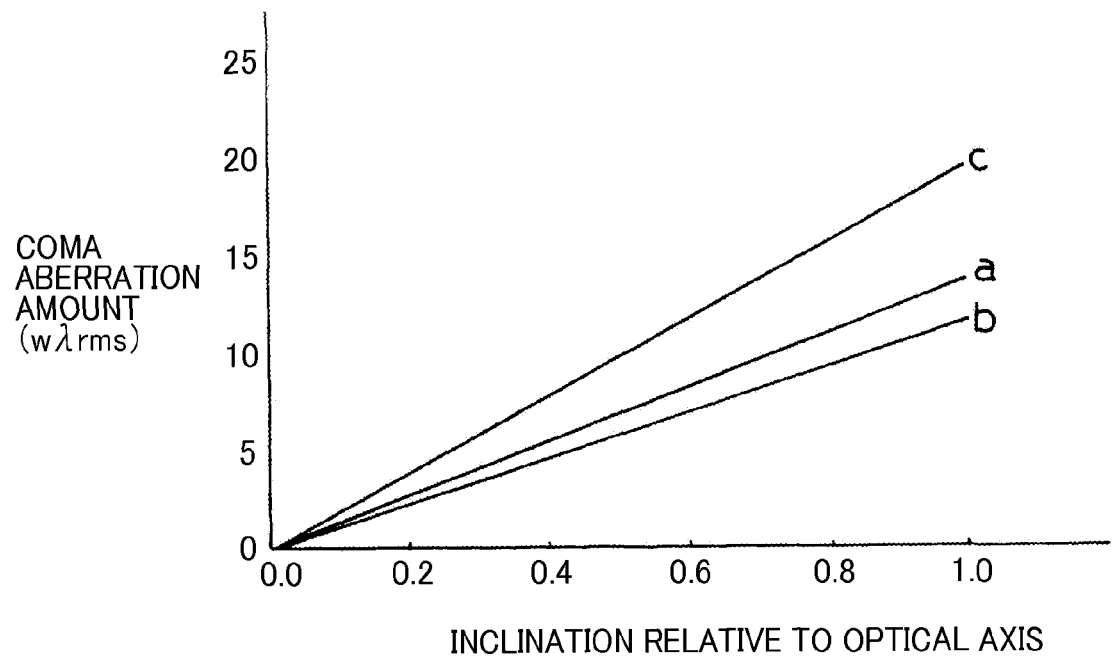
FIG. 3 is a characteristic diagram of a relationship between inclination relative to an optical axis of an objective lens and a coma aberration amount in laser beams having different wavelengths.

FIG. 3 depicts the image height characteristics in the objective lens, i.e., relationships between the coma aberration and the incident angles of the first laser beam (indicated by a), the second laser beam (indicated by b), and the third laser beam (indicated by c) relative to the objective lens, and as apparent from FIG. 3, the third laser beam has poor characteristics.

Figure 2:
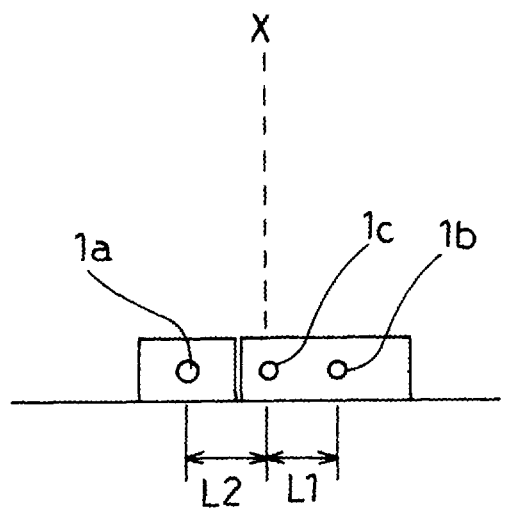
FIG. 2 is a diagram illustrating a three-wavelength laser diode included in an optical pickup apparatus according to an embodiment of the present invention.

Therefore, in an embodiment of the present invention, a first laser element 1a, a second laser element 1b, and a third laser element 1c are arranged as depicted in FIG. 2, and an optical axis of the third laser element 1c is arranged to coincide with an optical axis X of the objective lens 6.

L1 in FIG. 2 represents a distance between the second laser element 1b and the third laser element 1c, L2 represents a distance between the third laser element 1c and the first laser element 1a, and a relationship of L1<L2 is generally established due to a difference in characteristics between the monolithic type and the hybrid type described above.

In a case where a direction of the three-wavelength laser diode 1 is set such that an arrangement direction of the second laser element 1b and the third laser element 1c is not affected by a direction of the change in the spacing between the second return light and the third return light caused by the semitransparent mirror 7 and the AS plate 10, or a case where the spacing between the second return light and the third return light, which has been changed by the semitransparent mirror 7, is reset by the AS plate, with regard to the distance between the second laser element 1b and the third laser element 1c, if the magnification of the optical system is set at one, the distance between optical axes of the second return light and the third return light becomes the above described L1. Therefore, assuming that L3 represents a distance between the main beam light-receiving unit 112M making up the second-return-light receiving unit 112 and the main beam light-receiving unit 113M making up the third-return-light receiving unit 113 depicted in FIG. 5, when the second-return-light receiving unit 112 and the third-return-light receiving unit 113 included in the second photodetector 11 are configured so as to satisfy L1=L3, the second photodetector 11 can be used both as a photodetector for the second laser beam and a photodetector for the third laser beam, without the need of an optical axis correcting element being provided.

An embodiment of the present invention is applicable not only to an optical pickup apparatus for reading signals recorded in a Blu-ray-standard optical disc, a DVD-standard optical disc, and a CD-standard optical disc, but also to optical pickup apparatuses of other different standards.

In an embodiment according to the present invention, the word "semitransparent mirror" is used, however, this semitransparent mirror indicates a mirror that reflects a portion of incident light and allows a portion of light to pass therethrough, and is not necessarily limited to a mirror with a ratio between reflectance and transmittance of substantially 1:1.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   a three-wavelength laser diode including
      a first laser element configured to emit a first laser beam having a first wavelength for reading a signal recorded on a signal recording layer of a first optical disc;
      a second laser element configured to emit a second laser beam having a second wavelength, longer than the first wavelength, for reading a signal recorded on a signal recording layer of a second optical disc of a standard different from a standard of the first optical disc; and
      a third laser element configured to emit a third laser beam having a third wavelength, longer than the second wavelength, for reading a signal recorded on a signal recording layer of a third optical disc of a standard different from the standards of the first optical disc and the second optical disc,
      the first, second, and third laser elements housed in the same case;
   an objective lens on which the first to third laser beams are incident through the same optical path, the objective lens configured to focus the first to third laser beams onto the signal recording layers of the first to third optical discs, respectively;
   a first photodetector configured to be irradiated with first return light reflected from the signal recording layer of the first optical disc, a second photodetector configured to be irradiated with second return light and third return light respectively reflected from the signal recording layers of the second optical disc and the third optical disc;

a polarizing beam splitter configured to reflect the first to third laser beams in a direction of the objective lens so that the first to third laser beams are incident on the objective lens through the same optical path, and to allow the first return light to the third return light having passed through the objective lens to pass therethrough;

a semitransparent mirror on which the first return light to the third return light having passed through the polarizing beam splitter are incident, the semitransparent mirror configured to guide the first return light in a direction of the first photodetector, and to guide the second return light and the third return light in a direction of the second photodetector, and an astigmatism plate provided between the semitransparent mirror and the second photodetector, the astigmatism plate configured such that a spacing between the second return light and the third return light after passing through the semitransparent mirror and the astigmatism plate is the same as a spacing between the second return light and the third return light before passing through the semitransparent mirror.

2. The optical pickup apparatus of claim 1, wherein
the semitransparent mirror includes a first surface on which the first return light to the third return light having passed through the polarizing beam splitter are incident, and a second surface provided on an opposite side of the first surface, wherein the first return light having passed through the polarizing beam splitter is reflected by the first surface, and is guided in the direction of the first photodetector, and wherein the second return light and the third return light having passed through the polarizing beam splitter pass through the first surface and the second surface, and are guided in the direction of the second photodetector.

3. The optical pickup apparatus of claim 1, wherein
an optical axis of the third laser beam coincides with an optical axis of the objective lens.

4. The optical pickup apparatus of claim 3, wherein
the second photodetector includes a second-return-light receiving unit configured to receive the second return light and a third-return-light receiving unit configured to receive the third return light, and wherein a distance between the second-return-light receiving unit and the third-return-light receiving unit is set so as to be equal to a distance between the second laser element and the third laser element housed in the case.

5. The optical pickup apparatus of claim 3, wherein
the first, second, and third laser elements are disposed within the case such that the third laser element is positioned between the first laser element and the second laser element.

\* \* \* \* \*